UNITED STATES PATENT OFFICE.

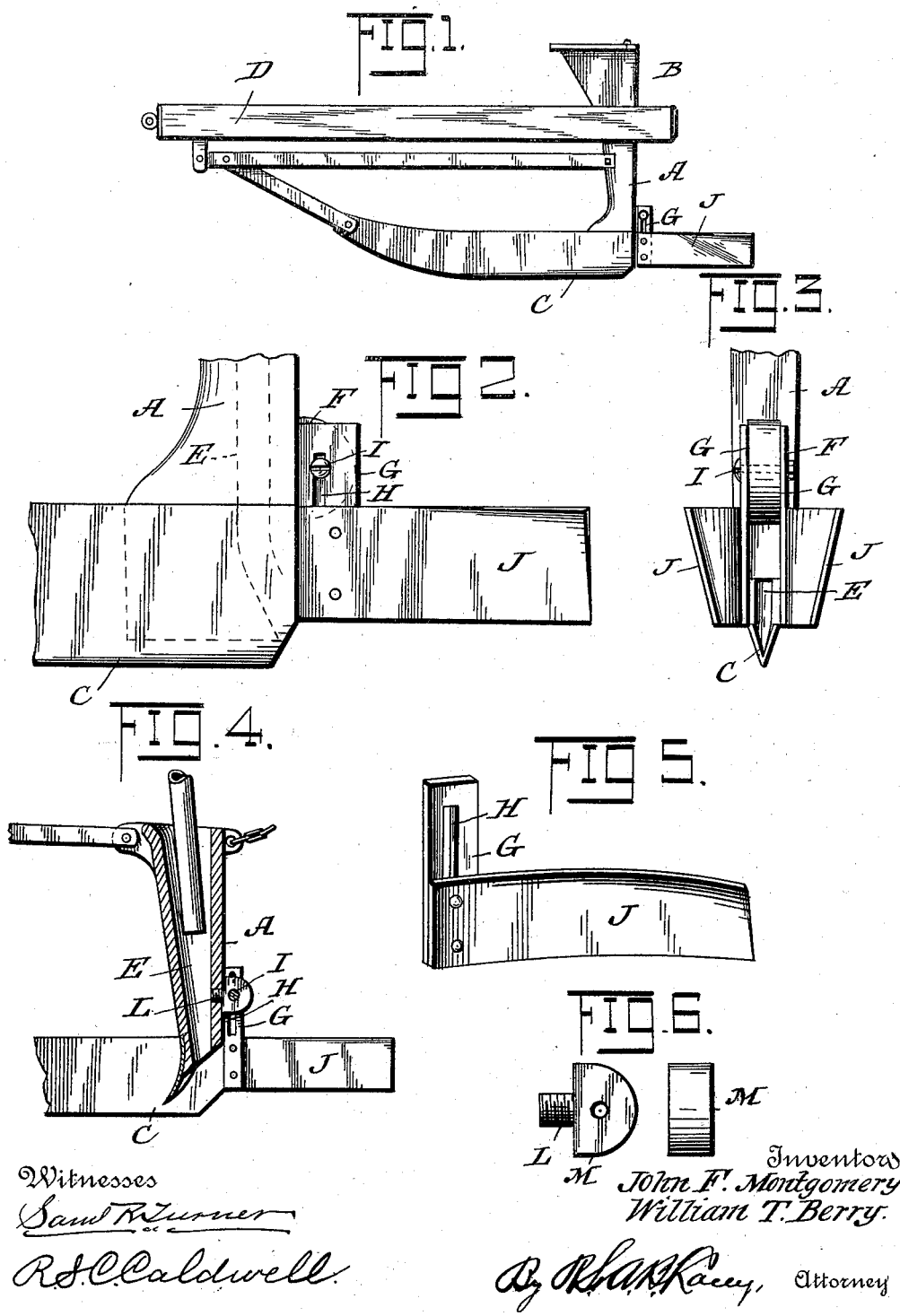

JOHN F. MONTGOMERY AND WILLIAM T. BERRY, OF COOSAWATTEE, GEORGIA.

GRAIN-DRILL.

SPECIFICATION forming part of Letters Patent No. 605,322, dated June 7, 1898.

Application filed March 14, 1898. Serial No. 673,819. (No model.)

*To all whom it may concern:*

Be it known that we, JOHN F. MONTGOMERY and WILLIAM T. BERRY, citizens of the United States, residing at Coosawattee, in the county of Gordon and State of Georgia, have invented certain new and useful Improvements in Grain-Drills; and we do hereby declare the following to be a full, clear, and exact description of the invention, such as will enable others skilled in the art to which it appertains to make and use the same.

Our invention relates to certain new and useful improvements in grain-drills, and particularly to those parts known as "shoes," and has for its object to produce means for planting grain at any desired distance below the surface and covering same at any desired depth.

With these and other objects in view our invention consists in the novel details of construction and combination of parts to be fully described hereinafter and clearly set forth in the appended claims.

Referring to the accompanying drawings, forming part of this specification, in which like letters of reference indicate the same parts, Figure 1 is a side elevation of a grain-drill embodying our improvement. Fig. 2 is an enlarged view of the heel thereof. Fig. 3 is a rear elevation of the same part. Fig. 4 is a sectional view of a different form of shoe with our improvement attached. Fig. 5 is a perspective view of one of the fenders, and Fig. 6 is a detail view of the lug.

A represents a standard with a hopper B on its upper end and connected to a runner C and beam D, forming a drill-shoe, as usual. A narrow passage-way E leads from the hopper B through the standard A and terminates at the beveled heel thereof, and it is through this passage-way that the grain travels from the hopper to the furrow. A lug F projects rearwardly from the standard just above the orifice of the passage-way and has two parallel vertical sides, with a hole passing therethrough. On each side of the lug is a metallic strip G, having a vertical slot H, and a bolt I passes through these slots and the hole in the lug to adjustably secure the strips in place.

Diverging plates J are riveted at their inner ends to the lower ends of the strips G and are flared outwardly at their rear ends on a gradually-increasing curve from the lower to the upper edges thereof, as clearly shown in Fig. 3. These plates J form fenders on each side of the shoe, which may be adjusted with relation to the runner by means of the slots H, to throw off the clods from the edge at any desired distance above the bottom of the furrow, thus enabling the planting of grain at a determined and uniform depth and covering with nothing but fine soil.

It is understood that the furrow cut by the shoe is very narrow, and that part which is left unturned by the fenders will be filled by the fine dirt crumbling from the sides and scattered by the fenders.

As a general rule the drill-shoes now in use are provided with a lug F; but where this is not so, as in the form shown in Fig. 4, we supply one by boring a hole in the heel of the shoe and threading therein the stem L of the lug M, which is similar in all respects to lug F.

With our improvement the difficulties of clogging, &c., accompanying the use of a press-wheel are overcome.

Having thus fully described our invention, what we claim as new and useful, and desire to secure by Letters Patent, is—

1. A grain-drill having, in combination, a standard, a furrow-forming shoe carried thereby, and a pair of fender strips or blades secured at their front ends to the heel end of the standard and having their rear ends flared outwardly and upwardly on a gradually-increasing curve from the lower to the upper edges thereof, substantially as described.

2. A grain-drill having, in combination, a standard, a furrow-forming shoe carried thereby, a lug on the heel end of the standard formed with parallel sides and a transverse bolt-hole, vertical fender-carrying strips arranged on the opposite sides of the lug and formed with longitudinal slots, a bolt passing through said slots and transverse hole in the lug and securing the strips to said lug, and a pair of fender-plates secured at their front ends to said strips and extending rearwardly therefrom, said plates being flared outwardly and upwardly at their rear ends on a gradually-increasing curve from the lower to the upper edges thereof, substantially as described.

In testimony whereof we affix our signatures in presence of two witnesses.

JOHN F. MONTGOMERY.
WILLIAM T. BERRY.

Witnesses:
W. M. TRIMMIER,
H. C. BYRAM.